US012682340B2

(12) United States Patent
De Caro et al.

(10) Patent No.: US 12,682,340 B2
(45) Date of Patent: Jul. 14, 2026

(54) PRIVACY-PRESERVING DECENTRALIZED MULTI-PARTY NETTING

(71) Applicants:International Business Machines Corporation, Armonk, NY (US); The Board of Trustees of the University of Illinois, Urbana, IL (US)

(72) Inventors: Angelo De Caro, Zürich (CH); Andrew Miller, Champaign, IL (US); Amit Agarwal, Champaign, IL (US)

(73) Assignees: International Business Machines Corporation, Armonk, NY (US); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 17/216,644

(22) Filed: Mar. 29, 2021

(65) Prior Publication Data

US 2022/0309492 A1     Sep. 29, 2022

(51) Int. Cl.
G06Q 20/36 (2012.01)
G06Q 20/06 (2012.01)
(Continued)

(52) U.S. Cl.
CPC ..... G06Q 20/3676 (2013.01); G06Q 20/0658 (2013.01); H04L 9/0643 (2013.01); *H04L 9/50* (2022.05)

(58) Field of Classification Search
CPC ........... G06Q 20/3676; G06Q 20/0658; G06Q 20/383; G06Q 20/389; G06Q 20/02; H04L 9/0643; H04L 9/50; H04L 2209/56
See application file for complete search history.

(56) References Cited

U.S. PATENT DOCUMENTS

| | | | | | |
|---|---|---|---|---|---|
| 10,810,546 | B2 * | 10/2020 | Hudson | .............. | G06Q 20/3829 |
| 2013/0311358 | A1 * | 11/2013 | Sethi | ...................... | G06Q 40/02 |
| | | | | | 705/39 |

(Continued)

FOREIGN PATENT DOCUMENTS

| | | | | |
|---|---|---|---|---|
| CN | 102122962 | A | * | 7/2011 |
| CN | 111275550 | A | * | 6/2020 |

(Continued)

OTHER PUBLICATIONS

Shengjiao Cao, Decentralized Privacy-Preserving Netting Protocol on Blockchain for Payment Systems, Feb. 2020, Financial Cryptography (Year: 2020).*

(Continued)

*Primary Examiner* — Chunling Ding
(74) *Attorney, Agent, or Firm* — CHIP LAW GROUP

(57) ABSTRACT

A method for a fully distributed privacy-preserving multilateral netting between parties is disclosed. The method comprising collecting pending transactions between at least a part of the parties, publishing a commitment of pending transactions to a bulletin board, secretly sharing de-commitments among the parties, and publishing, by each party, its determined liquidity status, to the bulletin board. Furthermore, the method comprises upon determining a failure in the publishing of any liquidity status, performing the following MPC by determining whether all pending transactions are settable maintaining positive liquidity for each party, and upon determining a failure in the determining, for each party, whether all pending transactions are nettable determining an optimized subset of transactions that are nettable without violating liquidity requirements for each party.

14 Claims, 7 Drawing Sheets

(51) Int. Cl.
H04L 9/00 (2022.01)
H04L 9/06 (2006.01)

(56) References Cited

U.S. PATENT DOCUMENTS

| | | | |
|---|---|---|---|
| 2018/0025435 A1 | 1/2018 | Karame | |
| 2019/0019186 A1* | 1/2019 | Falah | G06Q 20/405 |
| 2019/0325517 A1* | 10/2019 | Jayaram | G06Q 40/04 |
| 2019/0385157 A1* | 12/2019 | Mallela | G06Q 20/223 |
| 2021/0166193 A1* | 6/2021 | Ma | H04L 9/3239 |
| 2021/0192517 A1* | 6/2021 | Barnes | G06Q 20/389 |
| 2021/0342830 A1* | 11/2021 | Ferenczi | H04L 9/3218 |

FOREIGN PATENT DOCUMENTS

| | | | | | |
|---|---|---|---|---|---|
| CN | 111580981 A | * | 8/2020 | | G06Q 40/02 |
| CN | 111580981 B | * | 6/2022 | | G06F 9/52 |
| JP | 4879528 B2 | | 2/2012 | | |
| JP | 2019091129 A | * | 6/2019 | | |
| WO | WO-2020211073 A1 | * | 10/2020 | | G06Q 20/38 |

OTHER PUBLICATIONS

Xin Wang, Inter-Bank Payment System on Enterprise Blockchain Platform, 2018, IEEE (Year: 2018).*

Ken Naganuma, Decentralized Netting Protocol over Consortium Blockchain, Oct. 2018, ISITA (Year: 2018).*

Gareth W. Peters, Understanding Modern Banking Ledgers through Blockchain Technologies: Future of Transaction Processing and Smart Contracts on the Internet of Money, arxiv, 2015 (Year: 2015).*

Anonymous, Create Netting Agreements, 2007, Oracle Help Center, https://docs.oracle.com/en/cloud/saas/financials/24b/faugf/create-netting-agreements.html (Year: 2007).*

Morten L. Beach, Gridlock Resolution in Payment Systems, 2001, https://www.nationalbanken.dk/media/r2xgriaj/2001-mon4-grid67.pdf (Year: 2001).*

Shengjao Cao, Decentralized Privacy-Preserving Netting Protocol on Blockchain for Payment Systems, 2020, Semantic Scholar, https://www.semanticscholar.org/paper/Decentralized-Privacy-Preserving-Netting-Protocol-Cao-Yuan/5ed3e86e1459db5f7df238e1ca8d7d35773619e3 (Year: 2022).*

Xin Wang, Inter-Bank Payment System on Enterprise Blockchain Platform, 2018, IEEE, https://ieeexplore.ieee.org/stamp/stamp.jsp?tp=&arnumber=8457854 (Year: 2018).*

Oracle Help Center, Create Netting Agreements, 2007, https://docs.oracle.com/en/cloud/saas/financials/26a/faugf/create-netting-agreements.html#Business-Rules-and-Preferences (Year: 2007).*

Ken Naganuma, Decentralized Netting Protocol over Consortium Blockchain, 2018, IEEE, https://ieeexplore.ieee.org/stamp/stamp.jsp?tp=&arnumber=8664259&tag=1 (Year: 2018).*

Decentralized Privacy-Preserving Netting Protocol on Blockchain for Payment Systems. Shengjiao Cao (Ant Financial), Yuan Yuan (Ant Financial), Angelo De Caro (IBM Research), Karthik Nandakumar (IBM Research), Kaoutar Elkhiyaoui (IBM Research), Yanyan Hu (IBM Research) InFinancial Cryptography and Data Security: 24th International Conference, FC 2020, Kota Kinabalu, Malaysia, Feb. 10-14, 2020 Revised Selected Papers 24 2020 (pp. 137-155). Springer International Publishing.

Wang X, Xu X, Feagan L, Huang S, Jiao L, Zhao W. Inter-bank payment system on enterprise blockchain platform. In2018 IEEE 11th international conference on cloud computing (Cloud) Jul. 2, 2018 (pp. 614-621). IEEE.

Accenture, Re-imagining Interbank Real-Time Gross Settlement System Using Distributed Ledger Technologies, Nov. 2017 pp. 1-64.

Narula N, Vasquez W, Virza M. zkledger: Privacy-preserving auditing for distributed ledgers. In15th {USENIX} symposium on networked systems design and implementation ({NSDI} 18) 2018 (pp. 65-80).

Van Damgard and Jesper Buus Nielsen. "Universally Composable Efficient Multiparty Computation from Threshold Homomorphic Encryption". In: Advances in Cryptology—Crypto 2003, 23rd Annual International Cryptology Conference, Santa Barbara, California, USA, Aug. 17-21, 2003, Proceedings. vol. 2729. Lecture Notes in Computer Science. Springer, 2003, pp. 247-264. DOI: 10.1007/978-3-540-45146-4_15. URL: https://iacr.org/archive/crypto2003/27290247/27290247.pdf.

Torben Pryds Pederson in "Non-interactive and information-theoretic secure verifiable secret sharing", in Annual International cryptology conference, Springer, 1991, pp. 129-140.

Keller M. Mp-Spdz: A versatile framework for multi-party computation. In Proceedings of the 2020 ACM SIGSAC conference on computer and communications security Oct. 3, 20200 (pp. 1575-1590).

"Initc/HoneyBadgerMPC", Github, May 14, 2020, 7 pages.

"Scale-Mamba Software", retrieved from web https://nigelsmart.github.io/SCALE/, Jun. 2022, 4 pages.

Aly et al., "Benchmarking Privacy Preserving Scientific Operations", International Conference on Applied Cryptography and Network Security. Springer. 2019, pp. 509-529.

Karmarkar, "A new polynomial-time algorithm for linear programming", In Proceedings of the sixteenth annual ACM symposium on Theory of computing, 1984, pp. 302-311.

Lu et al. "HoneyBadgerMPC and AsynchroMix: Practical Asynchronous MPC and its Application to Anonymous Communication", In Proceedings of the 2019 ACM SIGSAC Conference on Computer and Communications Security. 2019, pp. 887-903.

Tomlin, "An experimental approach to Karmarkar's projective method for linear programming", In Computation Mathematical Programming, Springer, 1987, pp. 175-191.

Unknown, "Confidential Transactions", Retrieved from: https://web.archive.org/web/20190214011541/https://elementsproject.org/features/confidential-transactions, Retrieved on: Feb. 14, 2019, 4 pages.

* cited by examiner

100

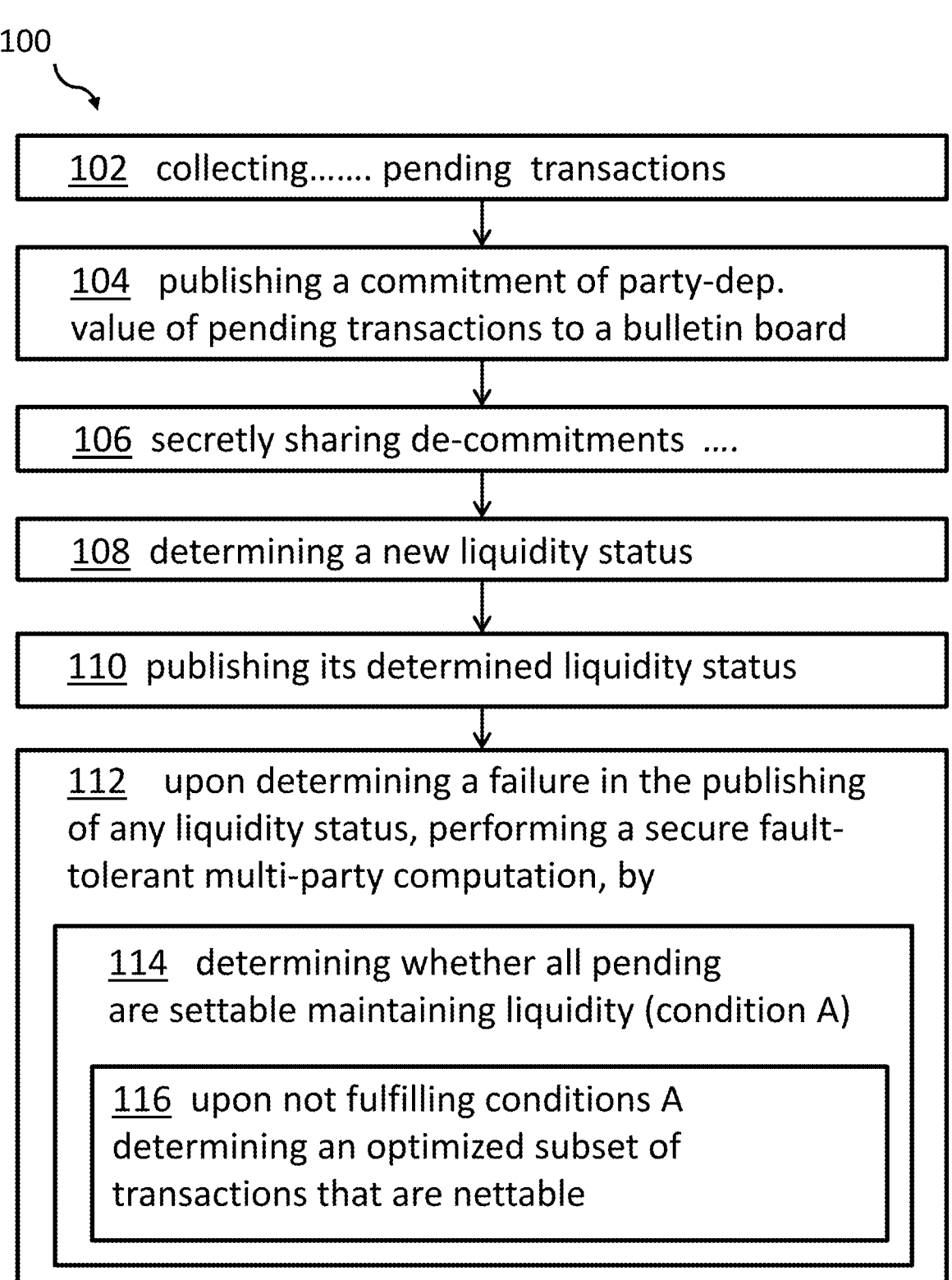

102   collecting……. pending  transactions 104   publishing a commitment of party-dep.
value of pending transactions to a bulletin board 106  secretly sharing de-commitments ….

108  determining a new liquidity status 110  publishing its determined liquidity status 112    upon determining a failure in the publishing
of any liquidity status, performing a secure fault-
tolerant multi-party computation, by 114   determining whether all pending
are settable maintaining liquidity (condition A)

116  upon not fulfilling conditions A
determining an optimized subset of
transactions that are nettable

$$\begin{pmatrix} [t_{aa}], t_{aa}, r'_{aa} & [t_{ab}]t_{ab}, r'_{ab} & [t_{ac}]t_{ac}, r'_{ac} \\ [t_{aa}], t_{aa}, r'_{aa} & [t_{ab}] & [t_{ac}] \\ [t_{aa}], t_{aa}, r'_{aa} & [t_{ab}] & [t_{ac}] \end{pmatrix}$$

404

$$\begin{pmatrix} [t_{aa}] & [t_{ab}] t_{ab}, r'_{ab} & [t_{ac}] \\ [t_{ba}] t_{ba}, r'_{ba} & [t_{bb}] t_{bb}, r'_{bb} & [t_{bc}] t_{bc}, r'_{bc} \\ [t_{ca}] & [t_c] t_{cb}, r'_{cb} & [t_{cc}] \end{pmatrix}$$

406

$$\begin{pmatrix} [t_{aa}] & [t_{ab}] & [t_{ac}] t_{ac}, r'_{ac} \\ [t_{ba}] & [t_{bb}] & [t_{bc}] t_{bc}, r'_{bc} \\ [t_{ca}] t_{ca}, r'_{ca} & [t_{cb}] t_{cb}, r'_{cb} & [t_{cc}] t_{cc}, r'_{cc} \end{pmatrix}$$

500

From Fig. 3

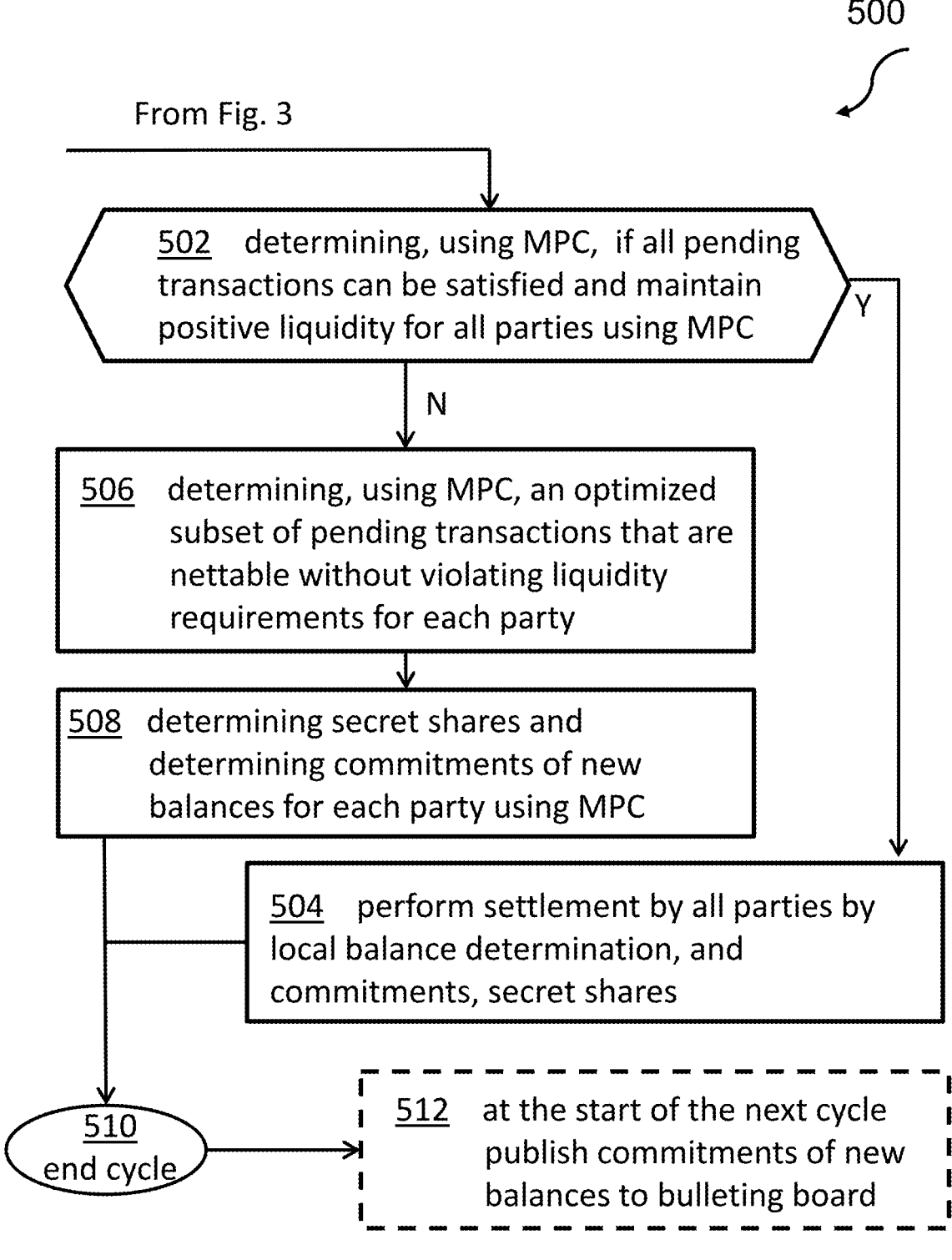

502   determining, using MPC,  if all pending transactions can be satisfied and maintain positive liquidity for all parties using MPC

Y

N 506   determining, using MPC, an optimized subset of pending transactions that are nettable without violating liquidity requirements for each party 508   determining secret shares and determining commitments of new balances for each party using MPC 504   perform settlement by all parties by local balance determination, and commitments, secret shares 510 end cycle 512   at the start of the next cycle publish commitments of new balances to bulleting board

PRIVACY-PRESERVING DECENTRALIZED MULTI-PARTY NETTING

BACKGROUND

The invention relates generally to a method for a netting or settlement between parties, and more specifically, to a method for a fully distributed privacy-preserving multi-lateral netting between parties. The invention relates further to a settlement system for a fully distributed privacy-preserving multi-lateral netting between parties, and a computer program product.

With the development of crypto-currencies decentralized ledger systems have been introduced that do not need a central instance. Hence, it seems that the responsibility of central points of control in such fungible token transactions is getting weaker and weaker. Central banks today have multiple responsibilities. They oversee the monetary system for a nation, or a group of them, and they oversee monetary policies for implementing specific goals such as low inflation, currency stability, and so on. Even though, the number of duties of central banks increased over time; and they are still responsible to provide the basic means by which large payments are settled electronically. These payments are typically wholesale payments between banks, and central banks are providers of interbank payment systems. Essentially, a central bank handles accounts in so-called central bank money for each local bank in its jurisdiction and makes sure that each account maintains a certain level of liquidity, i.e., reserve balance.

Traditionally, interbank payments were not processed and settled immediately but rather at the end of the day by netting the positions of each bank. As the volume of the value of the transaction increased over time, settling only at the end of the day increased the risk of a liquidity squeeze. To avoid dangerous shortage of liquidity, the central banks deployed the so-called real-time gross settlement system (RTGS) where payments are settled individually and immediately. The downside of these systems is that they require high liquidity levels. Multiple studies have shown that the liquidity demands in RTGS systems often reach substantial fractions of the annual GDP. Liquidity bottlenecks, also known as gridlocks, lead to interruptions in the interbanking payment systems, which have a detrimental effect on the entire financial system.

For this reason, the central banks have expanded RTGS systems with liquidity saving mechanisms (LSM) in order to increase the overall liquidity in the system. One of the most common LSMs is the well-known netting with which the central banks already operated. In more detail, in order to resolve gridlocks and increase liquidity, central banks operate as centralized payment queue. I.e., banks submit their payment instructions to this queue and then the central bank performs multi-lateral netting before proceeding with the settlement of the payments in the queue. Central banks are also trusted to preserve the confidentiality of payment instructions coming from each bank. Being a trusted party or, at the same time, a single point of failure, puts a huge stress on the central banks that translates to higher operational costs, more required computing resources and more personnel. Because of this, there is a need for central banks for option to balance the burden of maintaining and operate the system, i.e., the settlement process. Thereby, privacy, in particular, of the participating banks itself, but also for the constituents of the transactions—should not be compromised.

SUMMARY

According to one aspect of the present invention, a method for a fully distributed privacy-preserving multi-lateral netting between parties may be provided. The method may comprise collecting, by each party independently, pending transactions between at least a part of the parties, publishing, by each party, a commitment of a party-dependent total value of pending transactions to a bulletin board, wherein the bulletin board may be accessible by all parties, secretly sharing de-commitments among the parties, wherein each party-dependent de-commitment may enable a verification to the party-dependent total value of pending transactions as part of the related commitment, and publishing, by each party, its determined liquidity status to the bulletin board.

Furthermore, the method may comprise upon determining a failure in the publishing, by each party, of any liquidity status, performing the following secure fault-tolerant multi-party computation by determining whether all pending transactions may be settable maintaining positive liquidity for each party, and upon determining that the a failure in the determining, for each party, whether all pending transactions may be nettable, determining an optimized subset of transactions that may be nettable without violating liquidity requirements for each party.

According to another aspect of the present invention, a settlement system for a fully distributed privacy-preserving multi-lateral netting between parties may be provided. The system may comprise a plurality of nodes, wherein each node related to a party, and party wherein each node comprises a memory for storing program instructions, and a processor which, when executing the program instruction, may be enabled to collect independently pending transactions between at least a part of the parties, publish a commitment of a party-dependent total value of pending transactions to a bulletin board, wherein the bulletin board may be accessible by all parties, secretly share de-commitments among the parties, wherein each party-dependent de-commitment may enable a verification to the party-dependent total value of pending transactions as part of the related commitment, and publish its determined liquidity status, to the bulletin board.

Additionally, the processor may also be enabled upon determining a failure in the publishing of any liquidity status, to perform, using a subset of the plurality of nodes, the following secure fault-tolerant multi-party computation by determining whether all pending transactions may be settable maintaining positive liquidity for each, and upon determining a failure in the determining whether all pending transactions may be nettable, determining an optimized subset of transactions that are nettable without violating liquidity requirements for each party.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings:

FIG. 1 shows a block diagram of an embodiment of the inventive method for a fully distributed privacy-preserving multi-lateral netting between parties.

Figure 2:
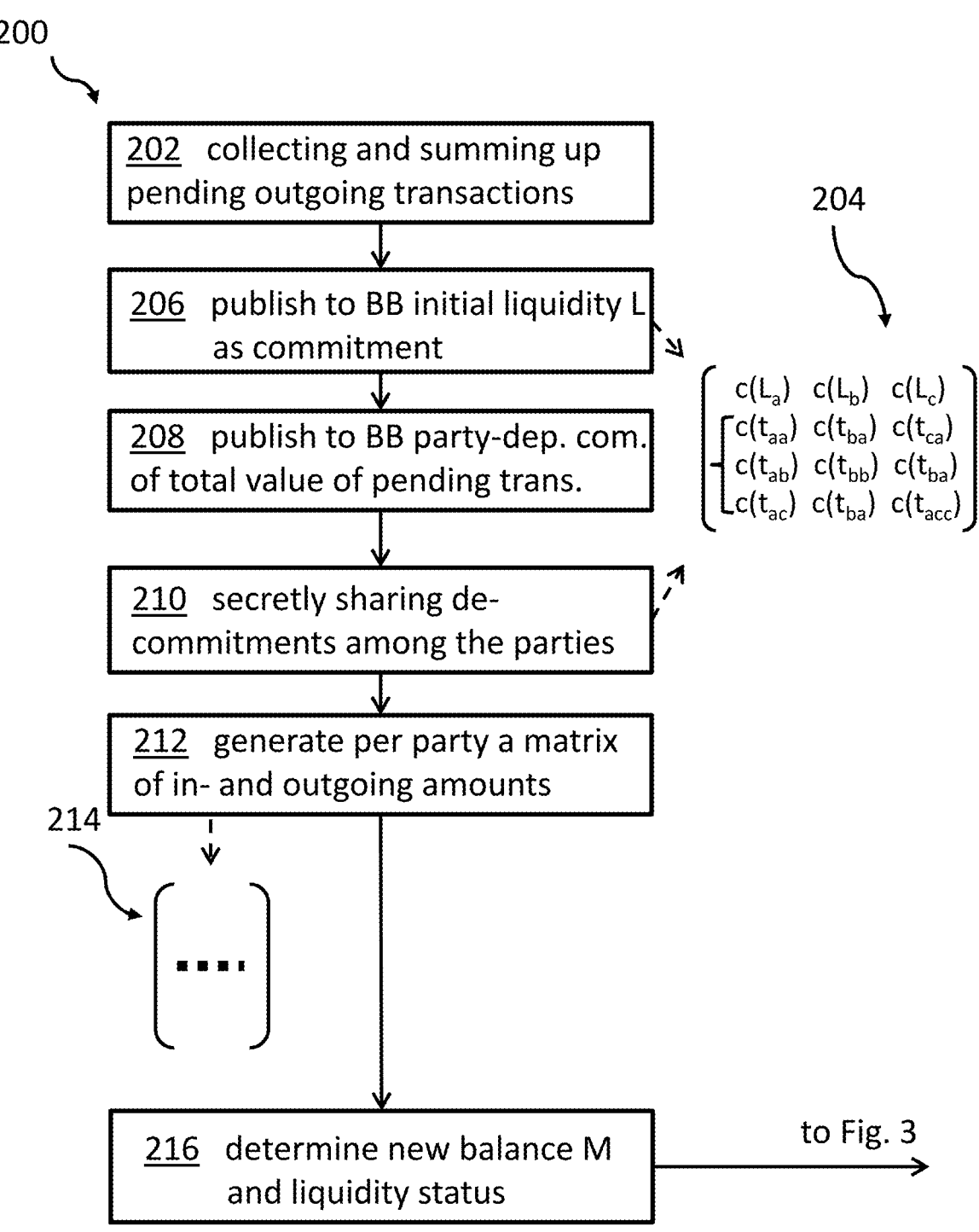

FIG. 2 shows a block diagram of a $1^{st}$ portion of a more implementation-near embodiment of the inventive concept.

Figure 3:
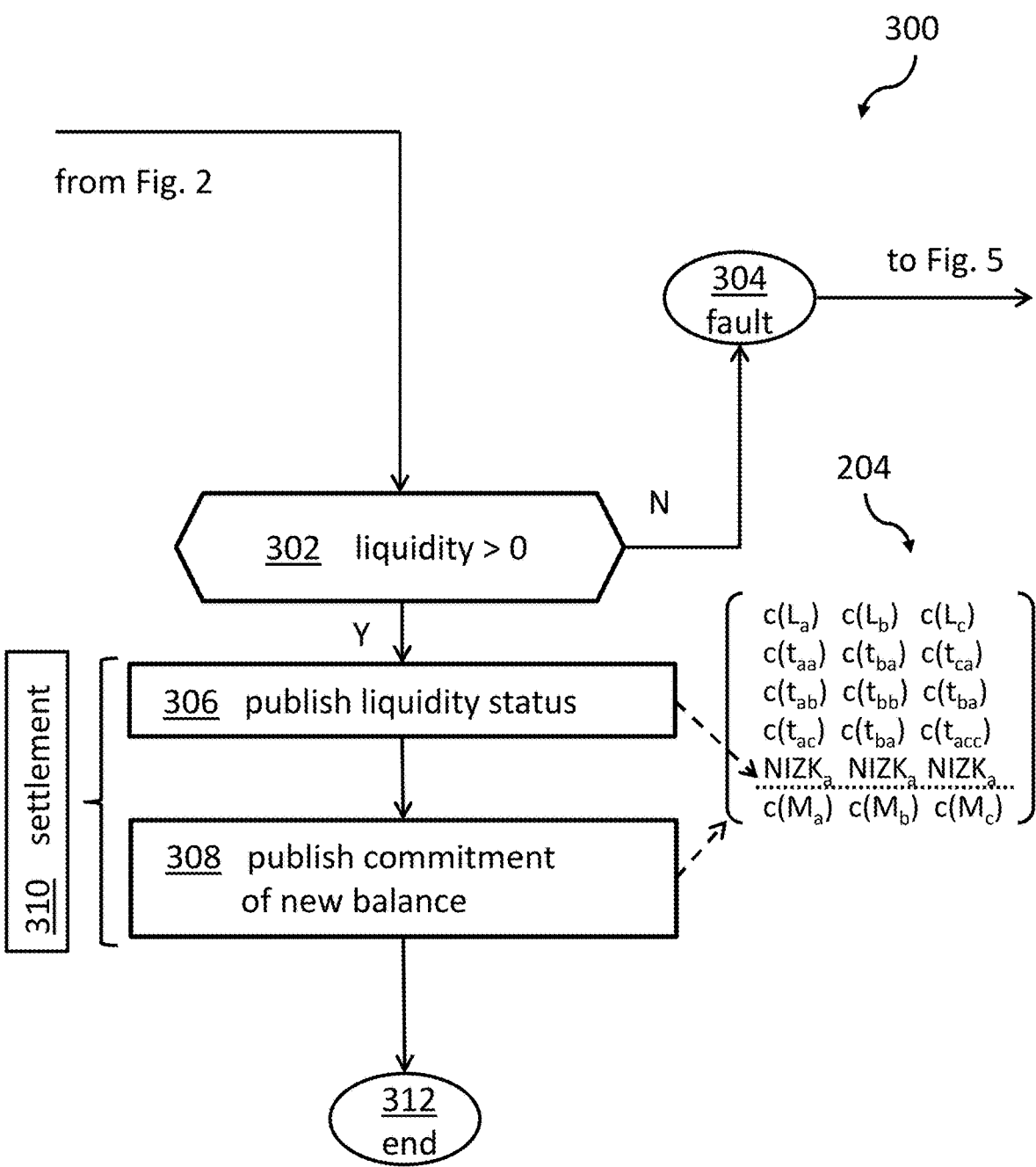

FIG. 3 shows a block diagram of a $2^{nd}$ portion of the more implementation-near embodiment of the inventive concept.

Figure 4:

FIG. 4 shows a block diagram of intermediate matrices used by the parties.

FIG. 5 shows a block diagram of a $3^{rd}$ portion of the more implementation-near embodiment of the inventive concept.

Figure 6:
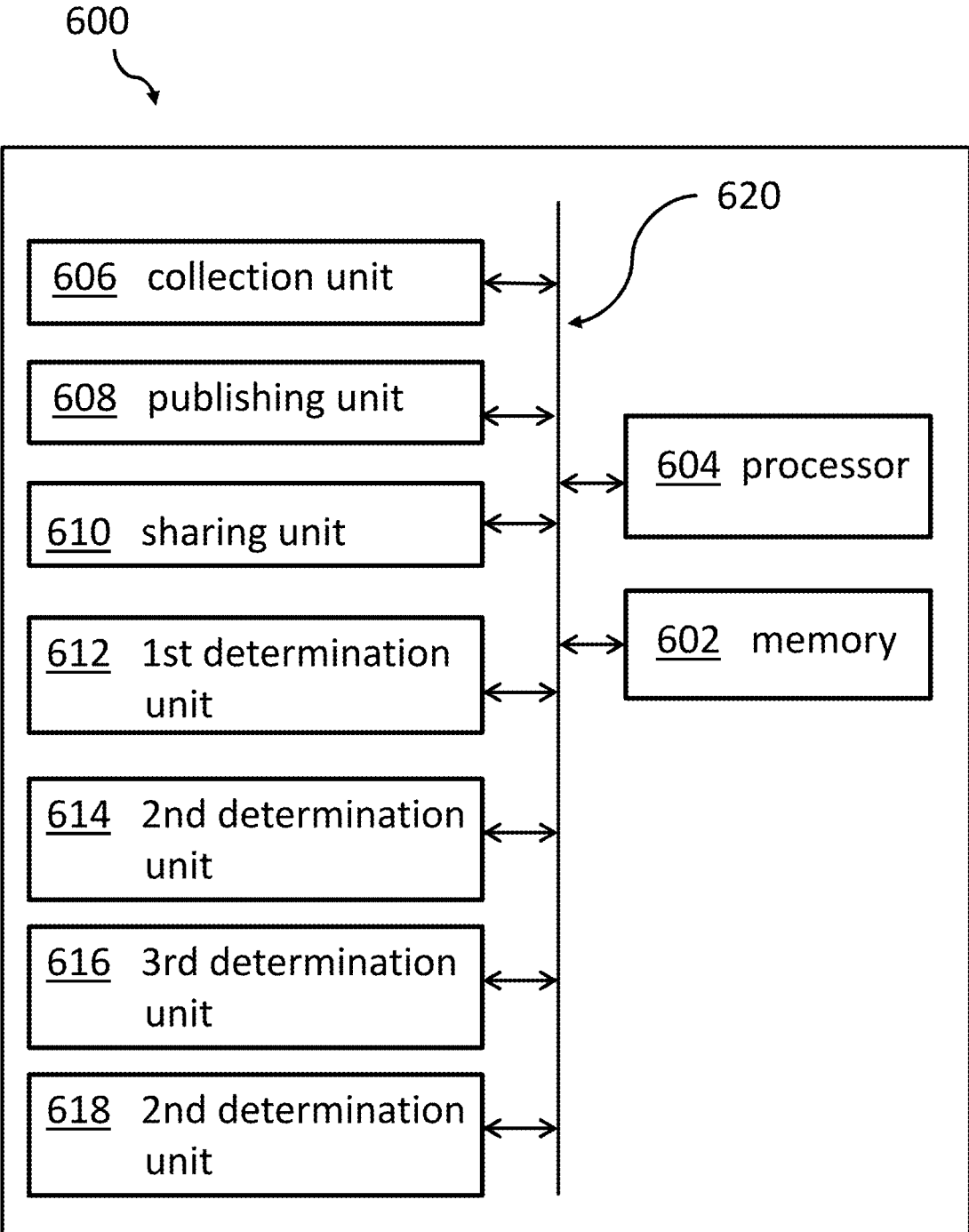

FIG. 6 shows a block diagram of an embodiment of the settlement system for a fully distributed privacy-preserving multi-lateral netting between parties.

Figure 7:
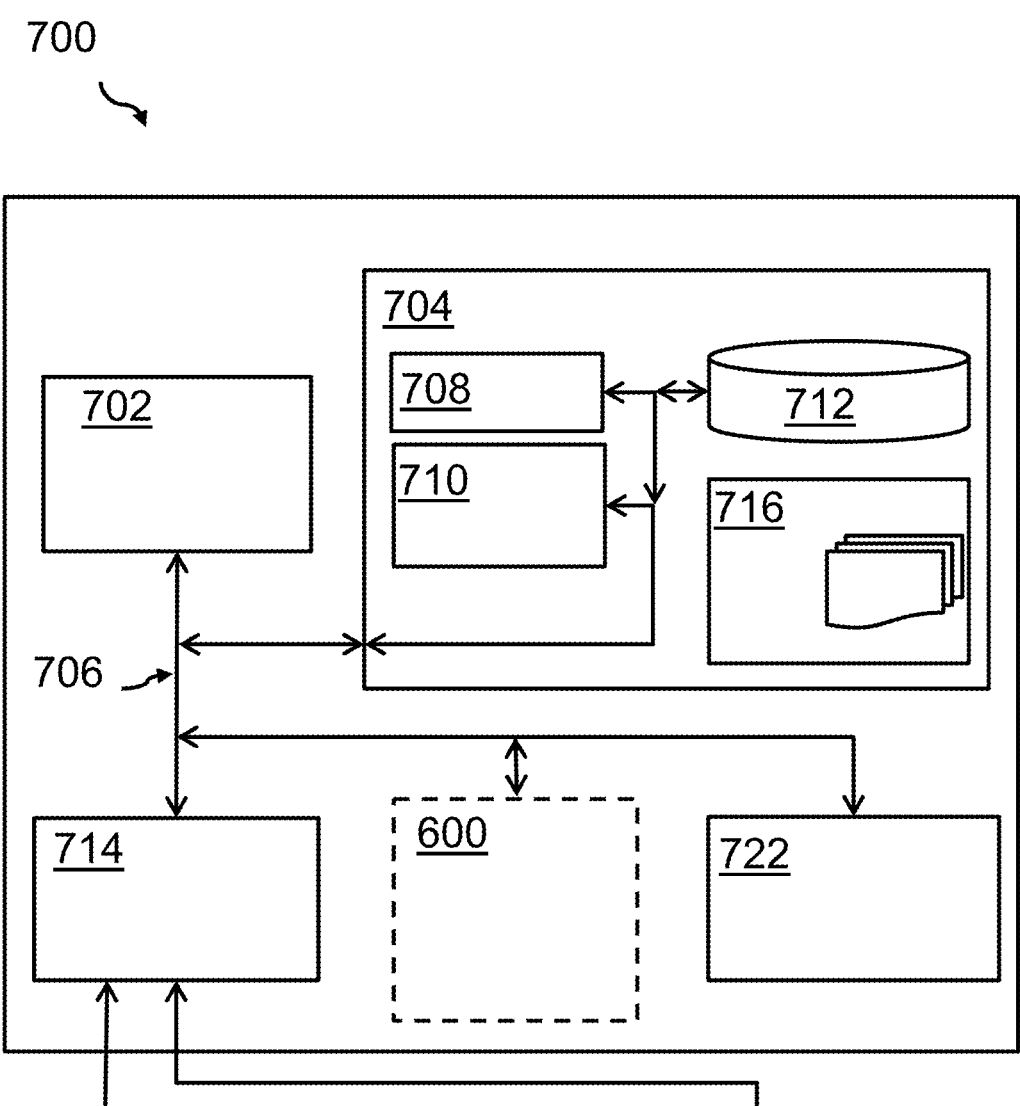

FIG. 7 shows a block diagram of a computing system comprising the settlement system according to FIG. 6.

DETAILED DESCRIPTION

In the context of this description, the following conventions, terms and/or expressions may be used:

The term 'fully distributed privacy-preserving multi-lateral netting' may denote a method and/or a system capable of automatically performing a transaction settlement process and/or protocol in a multi-party environment. The protocol may allow that only as little information as necessary for the netting process may be made known to other parties. Thus, the process may be described as privacy-preserving. It may also be distributed in the sense that no central instance may be required as a single management point of control.

The term 'pending transactions' may denote a plurality of individual transactions by one party that may be summed up to a total amount of pending transactions that may need to be set up and with at least one other party.

The term 'nettable' may denote a characteristic according to which only pending transactions can be settled. Thus, a total amount of pending transactions may be split in those that can be settled—i.e., the nettable portion—and those that cannot be settled because of given constraints, e.g., missing liquidity.

The term 'party' may denote a participant in the multi-party settlement process. This may, e.g., be a commercial bank. However, also other entities may be denoted as parties if they participate in the multi-party settlement process.

The term 'pending transaction' may denote a transaction which may have been accepted by a party from a customer or client of the party and which related amount should be transferred to another party. I.e., a pending transaction cannot be settled within the same party, but would need an interaction with another party to which client the transaction of, e.g., fungible tokens, may be directed.

The term 'settlement' may denote a process of netting fungible tokens between a plurality of parties. Each party may owe a first amount of fungible tokens to at least one other party and each party may expect a second amount of fungible tokens from at least one other parties. However, the reverse expectation is not a requirement.

The term 'fungible token' may denote a digital asset, e.g., an amount of a monetary value, like real money.

The term 'settlement' may denote here the process of determining a final balance between parties owing at least one other party—i.e., not every party may owe any other party something—defined amounts of fungible tokens. Thus, it may well be, that a sub-group the parties may only receive fungible tokens while others only need to transfer fungible tokens to another party.

The term 'bulletin board' may denote a memory for sharing information—i.e., shared memory—among a defined group of parties. One form of implementing the bulletin board for securely sharing information values of amounts of fungible tokens using a bulletin board may be a blockchain.

The term 'blockchain' 1—originally block chain—may refer to the known concept of storing data in a distributed way. The blockchain may be defined as a growing list of records, denoted as blocks that are linked using cryptography. Each block may comprise a cryptographic hash of the previous block, a timestamp, and transaction data (typically, represented as a Merkle tree).

By design, a blockchain is resistant to a modification of its data. This is because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system with high Byzantine fault tolerance. The blockchain has been described as "an open, distributed ledger that can record transactions between two parties efficiently and in a verifiable and permanent way". In the context of the here proposed concept, the bulletin board may be a blockchain and all of the advantages mentioned by be instrumental for the netting or settlement concept proposed here.

The term 'settlement group' may denote a sub-group of parties involved in a current netting or settlement process. The settlement group may have varying members depending on a specific settlement cycle. As an example: A current settlement group may involve party A, party B, party C and party D; a next settlement may involve party A, party B, party C and party E. This may happen because the current cycle party E would not have any pending transaction and none of the other parties have any settlement amounts for party E. The same thing happens to party D during the next settlement.

The term 'party dependent total settlement amount' denotes an expected amount of fungible tokens to be transferred from one party to another party, i.e., the amount owed by a first party to the second party.

The term 'liquidity status' denotes here a binary value: (i) liquid, (ii) non-liquid. For the case of three parties, it may be determined by $M_a = L_a + t_{ab} - t_{ac} - t_{ba} - t_{ac}$, wherein $M_a$=new liquidity value, $L_a$=old liquidity value, $t_{ab}$=expected value of fungible assets by party A to party B, $t_{ac}$=expected value of fungible assets by party A to party B, $t_{ba}$=expected value of fungible assets to be transferred from party A to party B, and $t_{ac}$=expected value of fungible assets to be transferred from party A to party C.

A positive liquidity status is reached if $M_a$>0 or >a predefined value >0 (i.e., a secure liquidity value). A negative liquidity status is reached if $M_a$<0 or <a predefined value >0.

The term 'current liquidity amount' may denote a numerical value that indicate funds available to a party, e.g., in the form of fungible tokens.

The term 'failure in the determining all own liquidity statuses' may denote that not all involved parties of the settlement group have been able to publish a positive liquidity. This may be for any reason, e.g., actually a negative liquidity of one party or, e.g., a timeout for a predefined publishing time window, or other reasons (e.g. technical problems).

The term 'multi-party computation' (MPC)—or more complete 'secure fault-tolerant MPC'—may denote in the context of this document a time consuming and resource intensive process among a plurality of computing nodes to jointly determine, by a linearly programmed optimization algorithm, an optimal set of partial transactions values that can be settled without reaching a non-liquid status for one of the parties. As an example, the Karmarkar algorithm may be used.

To be more specific, MPC may be defined here as a general-purpose secret-sharing based multiparty computation protocol MPC secure against n/3 active corruptions. Damgard and Nielsen defined an Arithmetic Black Box denoted by $F_{ABB}$ as an ideal functionality for MPC. (compare: Ivan Damgard and Jesper Buus Nielsen. "Universally Composable Efficient Multiparty Computation from Threshold Homomorphic Encryption". In: Advances in Cryptology—CRYPTO 2003, 23rd Annual International Cryptology Conference, Santa Barbara, California, USA, Aug. 17-21, 2003, Proceedings. Vol. 2729. Lecture Notes in Computer Science. Springer, 2003, pp. 247-264. DOI: 10.1007/978-3-540-45146-4_15. URL: https://iacr.org/archive/crypto2003/27290247/27290247.pdf). Other functionalities, like $F_{SFE}$ behave similarly. In general any MPC functionality providing a reactive interface would suffice for the here proposed concept. The MPC would be executed by a distributed quorum of server nodes which could be a consortium among the parties, e.g. the local banks. For ease of description, one would discriminate between server nodes and the parties (e.g. the local banks) in this description and assume, without loss of generality, that all parties may be part of the MPC consortium.

The term 'Karmarkar algorithm' is the known algorithm introduced by Narendra Karmarkar in 1984 for solving linear programming problems. It was the first reasonably efficient algorithm that could solve these problems in polynomial time. The alternatively used ellipsoid method is also solvable in polynomial time but proved to be inefficient in practice.

The term 'commitment' may relate to the known concept of a commitment scheme as a cryptographic primitive that may allow one to commit to a chosen value (or chosen statement or message or amount) while keeping it hidden from others, with the ability to reveal the committed value later. Commitment schemes are designed so that a party cannot change the value or statement after they have committed to it: that is, commitment schemes are binding. Commitment schemes have important applications in a number of cryptographic protocols including, zero-knowledge proofs, and secure computation.

A way to visualize a commitment scheme may be to think of a sender as putting a message in a locked box, and giving the box to a receiver. The message in the box may be hidden from the receiver, who cannot open the lock themselves. Since the receiver has the box, the message inside cannot be changed—merely revealed if the sender chooses to give them the key at some later time. Thereby, interactions in a commitment scheme may take place in two phases: (i) the 'commit' phase during which a value is chosen and specified, and (ii) the 'reveal phase' during which the value may be revealed and checked. In comparable simple protocols, the commit phase may comprise a single message—e.g., an amount of fungible tokens—from the sender to the receiver, i.e., from one party to another party. This message may be called 'the commitment'. It may be essential that the specific value chosen cannot be known by the receiving party at that time (this is called the 'hiding' property). A simple reveal phase would comprise of a single message, 'the opening' or 'de-commitment' from the sending party to the receiving party, followed by a determination or check performed by the receiving party. The value chosen during the commit phase must be the only one that the sending party may compute and that may be validated during the reveal phase (this may be denoted as the 'binding' property).

More specifically, the term 'commitment' may denote here a protected amount of fungible tokens. It may be a sum of a value of outgoing transactions from one party to another or the liquidity amount of a party. The commitment can be seen as a protecting or logically sealed abstract envelope (compare the locked box above) comprising the amount of fungible tokens as well as a random value. Thus, the logically sealed abstract envelope protects the value of the amount of fungible tokens from being recognizable as clear text. The value of the protected amount of fungible tokens may, so to speak, being obfuscated and thereby protected.

In particular, the commitment used in the context of the here described concept shall be a computationally binding and perfectly hiding commitment scheme which is additively homomorphic. This may, e.g., be implemented using a known Pederson commitment scheme which has been described by Torben Pryds Pederson in "Non-interactive and information-theoretic secure verifiable secret sharing", in Annual international cryptology conference, Springer, 1991, pp. 129-140.

Hence, the term 'de-commitment' may denote information about the content of the sealed envelope—or locked box (compare the paragraph above)—in order to confirm the content, i.e., the commitment which comprises the balance value and a random number. In other words, a commitment Com to a message 'a' may need a counterpart—the de-commitment D, hence the commitment pair C/D—to verify the commitment of the sending party. For this, the sending party may send the message 'a' and a related random number 'r' to verify the commitment.

The term 'secure secret sharing'—or simply secretly sharing, also denoted as 'secret splitting'—may denote methods for distributing a 'secret' among a group of parties, each of whom is allocated a 'share' of the secret. The secret may be reconstructed only when a sufficient number, of possibly different types, of shares are combined together; individual shares may be of no use on their own.—In one type of a secret sharing scheme, there may be one dealer and n parties. The dealer may give a share of the secret to the parties, but only when specific conditions may be fulfilled will the parties be able to reconstruct the secret from their shares. The dealer may accomplish this by giving each party a share in such a way that any group oft (i.e., threshold) or more parties may together reconstruct the secret but no group of fewer than t players may. Such a system may be denoted as (t, n)-threshold scheme.

The term 'secure fault-tolerant multi-party computation'—also known as secure computation, multi-party computation (MPC), or privacy-preserving computation—may denote a subfield of cryptography with the goal of creating methods for parties to jointly compute a function over their inputs while keeping those inputs private. Unlike traditional cryptographic tasks, where cryptography assures security and integrity of communication or storage and the adversary is outside the system of participants (an eavesdropper on the sender and receiver), the cryptography in this model protects participants' privacy from each other.—

This type of computation and protocol is about concealing partial information about data while computing with the data from many sources, and correctly producing outputs.

The term 'zero knowledge proof'—or zero-knowledge protocol; in short: ZK—may denote in cryptography a method by which one party (the prover) may prove to another party (the verifier) that they know a value x, without conveying any information apart from the fact that they know the value x. The essence of zero-knowledge proofs is that it is trivial to prove that one possesses knowledge of certain information by simply revealing it; the challenge is to prove such possession without revealing the information itself or any additional information.

If proving a statement may require that the prover possesses some secret information, then the verifier will not be able to prove the statement to anyone else without possessing the secret information. The statement being proved must include the assertion that the prover may have such knowledge, but not the knowledge itself. Otherwise, the statement would not be proved in zero-knowledge because it provides the verifier with additional information about the statement by the end of the protocol. A zero-knowledge proof of knowledge is a special case when the statement consists only of the fact that the prover possesses the secret information.

'Interactive zero-knowledge proofs' may require interactions between the individual (or computer system) proving their knowledge and the individual validating the proof.

The term 'non-interactive zero-knowledge proof'—also known as NIZK, zk-SNARK, zk-STARK—may denote and relate to the known concept of zero-knowledge proofs that may require no interaction between the prover and verifier.

Advantageously usable in the context of the here proposed concept is a non-interactive zero-knowledge scheme NiZKAoK. This may be instantiated using the known Schnorr NIZK. For range proofs specifically, one may also the known Bulletproofs in Fiat-Shamir mode.

The proposed method for a fully distributed privacy-preserving multi-lateral netting between parties may offer multiple advantages, technical effects, contributions and/or improvements:

The here proposed concept may describe a secure decentralized protocol that a consortium of local banks—or other institutions—may use to complete a netting process in a privacy-preserving manner without relying on a single central instance, e.g., a central bank. In order to achieve this advantageous goal, the concept makes use of two ingredients: zero-knowledge proofs and secure multiparty computation. Thereby, a multi-phase protocol may be constructed and its security can be proven.

Furthermore, a linear programming concept may be used to find an optimal solution to the netting problem in gridlock scenarios. In order to achieve this, the here proposed protocol may make use of MP-SPDZ (compare Marcel Keller, "A Versatile Framework of multi-party computation", Cryptography eprint archive, report 2020/521, https://eprint.iacr.org/2020/521, 2020) and may achieve a 40% to 50% higher percentage settlement of the total transaction volume.

In contrast to existing solutions, a robust and fault-tolerant solution may be achieved which does not get stuck in case some parties abort the protocol. Furthermore, a maximum of confidentiality for the banks may also be achieved.

Additionally, the base protocol, or the optimistic phase used in normal situations where no bank runs out of liquidity is computationally comparatively low. Only in exceptional cases, the additionally possible multi-party computation portion of the protocol may have to be activated.

Furthermore, the distinct focus on "partial settlement" which may allow some fraction of a transaction to be processed (instead of "binary settlement")—may enable to achieve even more efficient handling of gridlock scenarios. It was also possible to show that that concept proposed can achieve a settlement value that is up to 50% higher percentage than existing solutions.

The concept proposed here may free up computational resources on the part of a central bank for settlement between participating commercial banks as well as a single point of failure—i.e., the central bank—may be eliminated in the netting process.

The use of a bulletin board for sharing information—however in a non-completely disclosed form—using blockchain technology may also be judged to be an advantage of the here proposed concept. Blockchain technology is known as a reliable data platform for distributed ledgers. Again, these advantages may help support the trustworthiness of the concept proposed here.

Additionally, in the second portion of the here proposed protocol not all banks involved in the netting process have to participate in the multiparty computation but only a honest quorum of banks may be needed in order to achieve a netting between all participating banks, i.e., a settlement group.

In the following, additional embodiments of the inventive concept—applicable for the method as well as for the system—will be described.

According to a preferred embodiment, the method may comprise the publishing, by each party, its determined liquidity status may also comprise determining, by each party, its own new liquidity amount using its current liquidity amount and verified party-dependent total amounts of pending transactions via the bulletin board. The new liquidity amount may also be the base to determine the liquidity status. If the new liquidity amount >0 or larger than a predefined minimum amount, the liquidity status is determined to be positive, otherwise negative. The liquidity status may be published to the bulletin board in the form of a non-interactive zero-knowledge proof.

According to another preferred embodiment, the method may also comprise publishing, by each party, a commitment of its new liquidity amount. Thus, the bulletin board may comprise both, the current liquidity and a new liquidity amount, both in form of a commitment. Already here one may see that the amount of information on the bulletin board continues to grow from netting cycle to netting cycle.

According to one advanced embodiment, the method may also comprise, upon not settling all pending transactions in the multi-lateral settling, carrying over the not settled transactions for a next settlement cycle. This may be sometime later or during the next day in case the netting process typically happens once a day. Thus, no fungible tokens may be lost, only the settlement process may be partially deferred to a predetermined later point in time. Thus, the credibility of the proposed solution should not be in question.

According to a useful embodiment of the method, the determining an optimized subset—i.e., a maximum of netting value—of transactions may use a Karmarkar algorithm. Hence, the here proposed concept may easily make use of such proven concepts.

According to an advanced embodiment of the method, the bulletin board may be implemented as a blockchain. The bulletin board, i.e., the blockchain may be operated by a trusted sub-group of the parties or, alternatively, by a trusted institution which may not necessarily be the central bank. It may also be a commercial technology provider because not any clear-text data of the bulletin board may be shared anyway. Hence, also in this case, privacy may be preserved.

According to another enhanced embodiment of the method, a transaction between parties may relate to one type fungible tokens—e.g., Euros only—or to more than one type of fungible tokens, e.g., Euros and Dollars. Hence, the here proposed concept may also be able to perform the netting in different value categories at the same time, either in the optimistic phase of the protocol which may be relatively light-weight regarding required computing resources or in the MPC phase.

According to a further enhanced embodiment of the method, a pending transaction may be priority-flagged, wherein a related priority flag value is indicative of a priority for a settlement of the respective transaction. This may be especially useful in case of the MPC phase of the protocol in which typically not all amounts may be settled but only an optimized amount.

According to a permissive embodiment of the method, the secure fault-tolerant multi-party computation may be performed by a sub-group of the parties, e.g., an honest quorum of parties, or better by their respective computing nodes. This way, resources may be freed up at those parties not being part of the sub-group.

According to one advantageous embodiment of the method, the publishing, by each party, its liquidity status may be performed using the concept of a non-interactive zero-knowledge proof. This may be seen as a valuable aspect of the proposed concept and the ability to preserve privacy.

According to one further advantageous embodiment of the method, the portion of the method according to which all pending transactions are settable maintaining positive liquidity for each party may also comprise performing a netting among the parties. This would mark an end of a settlement cycle, either in the optimistic phase of the protocol or in the MPC phase.

In the following, a detailed description of the figures will be given. All instructions in the figures are schematic. Firstly, a block diagram of an embodiment of the inventive method for a fully distributed privacy-preserving multi-lateral netting between parties is given. Afterwards, further embodiments, as well as embodiments of the settlement system for a fully distributed privacy-preserving multi-lateral netting between parties will be described.

FIG. 1 shows a block diagram of a preferred embodiment of the method 100 for a fully distributed, i.e., decentralized, privacy-preserving multi-lateral netting between parties, e.g., a settlement group. The method 100 comprises collecting, 102, by each party independently, pending transactions between at least a part (or a portion) of the parties. The pending transactions relate to the ones needing settlement, e.g., to be transferred to another party or bank, i.e., the outgoing transactions of a party. The method may relate to all parties having theoretically fungible tokens to be netted. However, if some parties do not have anything to be settled, they may be excluded temporarily in the protocol, so that only a sub-group of the parties may perform the protocol.

The method 100 also comprises publishing, 104, by each party, a commitment of a party-dependent total value of pending transaction to a bulletin board as the commitment, wherein the bulletin board is accessible by all parties. This does not mean individual transactions that a party may have carried out for one of their clients, but the total volume of outgoing transactions. Additionally, to verify the value inside the commitment, a party would need a de-commitment.

Furthermore, the method 100 comprises secretly sharing, 106, de-commitments among the parties. Thereby, each party-dependent de-commitment enables a verification to the party-dependent total value of pending transactions as part of the related commitment, e.g., in order to verify the settlement amount or pending transaction for the specific party; i.e., only the addressed party can verify the individual settlement amount.

Moreover, the method 100 comprises publishing, 110, by each party, its determined, 108, liquidity status—which is a binary value—to the bulletin board. A negative liquidity status is not required to be published in NIZK form. The relevant party may choose to not publish the liquidity status. This would mean that the optimistic phase failed and the method enters the MPC phase.

I.e., upon determining, 112, a failure in the publishing, by each party, of any liquidity status, performing the following secure fault-tolerant multi-party computation. Hence, at least one party has not published its (positive) liquidity status or a timeout happened or any other failure like lost network connection or the like. At this point in time, the fallback procedure is initiated, i.e., the MPC phase. Otherwise, a commitment of the new liquidity amount is published (as commitment; not shown) to the bulletin board and the netting cycle closes.

This phase of the method 100 comprises determining, 114, whether all pending transactions are settable maintaining positive liquidity for each party (i.e., ignoring the partially already published new liquidity status). If that is the case, the netting process is executed.

If not, and upon determining that a failure in the determining, for each party, whether all pending transactions are nettable has happened, the method 100 comprises determining, 116, an optimized subset of transactions that are nettable without violating liquidity requirements for each party. This way, e.g., the maximum of netting value may be cleared during this cycle.

FIG. 2 shows a block diagram 200 of a $1^{st}$ portion of a more implementation-near embodiment of the inventive concept. The process starts with collecting and summing up, 202, pending outgoing transactions. In a next step, each of the participating parties may publish, 206, its initial liquidity $L_i$ as a commitment—denoted here as $C(L_i)$—to the bulletin board which may be represented by the matrix 204. This example with three parties, three commitments of values or amounts of outgoing or pending transactions of party a, b, c, i.e., the commitments $c(L_a)$, $c(L_b)$, $c(L_c)$, may be published.

In a next step, each party publishes, 208, to the bulletin board 204 party dependent commitments of total values of pending transactions in respect to other parties. Hence, the commitment $c(t_{ba})$ represents the total amount of outgoing or pending transactions from party b to party a.

However, without any de-commitment none of the values in the bulletin board 204—which may be implemented as a blockchain—is available in clear-text. In order to verify the commitments, partly by party, the parties secretly share, 210, the commitments among the parties, so that each party may verify its related commitment of the bulletin board 204.

With the information received and verified, each party is enabled to generate, 212, for itself a matrix of in- and outgoing amounts to other parties. Examples for the three parties are symbolized by the bracket 214 which is detailed for each of the parties in FIG. 4.

Based on this information of the individual matrices per party, each party can determine, 216, its new balance M and hence its liquidity status. Referring also to FIG. 4, the new balance for party a can be determined by $M_a = L_a + t_{ab} + t_{ac} - t_{ca} - t_{ca}$. It is a straightforward determination wherein $L_a$ is the current liquidity amount, $t_{ab} + t_{ac}$ are amounts to be received from other parties (namely, party b and c) and $t_{ba} - t_{ca}$ are amounts to be transferred from party a to by party b and party c. If $M_a > 0$, the liquidity status would be positive, otherwise negative. Instead of a comparison to "zero", also a comparison to a minimum amount of minimum liquidity may be made. The minimum liquidity amount may vary from party to party.

The process continues on FIG. 3 which shows a block diagram 300 of a $2^{nd}$ portion of the more implementation-near embodiment of the inventive concept. In case the liquidity of a party is not above zero—case "N" (compare determination 302)—the respective party may choose not to publish its liquidity status to the bulletin board 204. Hence, a fault 304 has happened in the optimistic phase.

In case the liquidity of the specific party is guaranteed—case "Y"—the respective party publishes, 306, its new liquidity status as non-interactive zero knowledge proofs (NIZK) to the bulletin board 204. Additionally, each party publishes, 308 also its new balance amount as a commitment $c(M_a)$, $c(M_b)$, $c(M_c)$ to the bulletin board 204. The steps 306 and 308 may also be seen as the settlement 310 or the netting of the pending amount transactions. This also marks the end 312 of the optimistic phase.

However, in case a fault 304 has happened during the optimistic phase—i.e., no settlement process has been performed—the process continues on FIG. 5. The fault 304 may happen because one of the parties has not confirmed its liquidity by publishing its liquidity status in NIZK form or by a simple timeout, a network problem or any other error in this situation.

The following steps of the process of FIG. 5, which shows a block diagram 500 of a $3^{rd}$ portion of the more implementation-near embodiment of the inventive concept, are all performed in multi-party computing (MPC) mode. All parties of the settlement group may be involved in this MPC or only a sub-group, i.e., a quorum, of the parties can perform the MPC activities for all parties.

Firstly, a determination 502 is executed in order to determine of all pending transactions can be satisfied under the constraint that positive liquidity is maintained for all parties. If that is the case—case "Y"—the process continues with performing, 504—as described in the context of settling 310 in FIG. 3 (i.e., without using MPC)—a netting for all parties by determining local balances, commitments and local shares. Also the random number is updated, e.g., from r' to s'.

The process or protocol of the actual cycle ends here, 510. At the beginning of the next netting cycle, the commitments are published, 512, to the bulletin board. Additionally, the secretly sharing the new balance among the parties is executed.

However, if the netting is not possible—case "N"—the process continues with determining, 506, an optimized subset of pending transactions that are nettable without violating liquidity requirements for each party. In order to determine the optimized subset, a plurality of different methods may be used, one of which may be there Karmardar method or algorithm.

Based on this result, the new secret shares and the commitments to the new balance of each party is determined by MPC (compare 508). Furthermore, the random numbers for the parties are also updated, e.g., from r' to s'. Then the process would end, 510, identically if compared to the case in which a complete settlement could be achieved. Also here, the publishing 512 would happen at the start of the next cycle.

FIG. 4 shows a block diagram of intermediate matrices 400 used by the parties. Again, here an example of three parties is shown. Party a would be able to generate for itself matrix 402 to, party b would be able to generate for itself matrix 404 and, party c would be able to generate for itself matrix 406.

Each element in the matrix which one of the parties may verify and use for its further calculations (determining its consolidated new balance) comprises the commitment—e.g., $[t_{ab}]$ $t_{ab}$ $r_{ab}'$ of the value of the sum of outgoing transactions from one of the parties, the respective clear-text, and a respective random value $r_{ab}'$ used for the value access. It may be noted that in each cycle—i.e., each new settlement process—a new random value—or better, a set of new random values—may be used. It may also be noted that the random values, e.g., $r_{ab}'$, may be pair-specific, i.e., each pair of parties party a/party b would use its own unique, single way random value $r_{ab}'$ which would be different to $r_{ba}'$.

During an initialization phase, each participating party may receive its random value from a central party, e.g., the central bank. It may also publish the commitments of the initial liquidity amounts to the bulletin board. However, this may only happen once and the central bank may no longer be required for an executing of the new proposed protocol. However, it may supervise the process.

FIG. 6 shows a block diagram of an embodiment of the settlement system for a fully distributed privacy-preserving multi-lateral netting between parties. The system comprises a plurality of nodes, wherein each node 600 relates to a party, wherein each node comprises a memory 602 for storing program instructions, and a processor 604 which, when executing the program instruction, is enabled to the following. However, it should be noted that the figure may show only units in modules of one of the nodes of a party.

The processor 604 may thus be enabled to collect—in particular, by a collection unit 606—independently pending transactions between at least a part of the parties, publish—in particular, by a publishing unit 608—a commitment of a party-dependent total value of pending transactions to a bulletin board, wherein the bulletin board is accessible by all parties, and secretly share—in particular, by a sharing unit 610—de-commitments among the parties, wherein each party-dependent de-commitment enables a verification to the party-dependent total value of pending transactions as part of the related commitment.

The processor 604 may thus also be enabled to publish—in particular by the publishing unit 608—its determined liquidity status to the bulletin board 204 (compare FIG. 2), and upon determining—in particular by a first determination unit 612—a failure in the publishing of any liquidity status, perform, using a subset of the plurality of nodes, the following secure fault-tolerant multi-party computation by determining—in particular by a second determination unit 614—whether all pending transactions are settable maintaining positive liquidity for each, and upon determining—in particular, by a third determination unit 616—a failure in the determining whether all pending transactions are nettable determining—in particular by a subset determination unit 618—an optimized subset of transactions that are nettable without violating liquidity requirements for each party.

It shall also be mentioned that all functional units, modules and functional blocks—namely, the memory 602, the processor 604, the collection unit 606, the publishing unit 608, the sharing unit 610, the first determination unit 612, the second determination unit 614, the third determination unit 616, and the subset determination unit 618—may be communicatively coupled to each other for signal or message exchange in a selected 1:1 manner. Alternatively the functional units, modules and functional blocks can also be linked to a node internal bus system 620 for a selective signal or message exchange.

Embodiments of the invention may be implemented together with virtually any type of computer, regardless of the platform being suitable for storing and/or executing program code. FIG. 7 shows, as an example, a computing system 700 suitable for executing program code related to the proposed method on one of the nodes 600.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, a node 600 of the settlement system for a fully distributed privacy-preserving multi-lateral netting between parties may be attached to the bus system/06.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for a multi-lateral netting between parties, the method comprising:

collecting, by at least one hardware processor of each node related to each party of the parties independently, pending transactions between at least a part of the parties;

publishing, by the at least one hardware processor of each node related to each party of the parties, a commitment of a party-dependent total value of the pending transactions to a bulletin board, wherein the bulletin board is accessible by all the parties;

secretly sharing de-commitments among the parties, wherein each party-dependent de-commitment enables a verification to the party-dependent total value of the pending transactions as part of the commitment;

computing, using a multi-party computation protocol, a revised balance after the multi-lateral netting in a process configured to handle the pending transactions;

publishing, by the at least one hardware processor of each node related to each party of the parties, a determined liquidity status to the bulletin board;

upon determining a failure in the publishing, by the at least one hardware processor of each node related to each party of the parties, of the determined liquidity status, performing a secure fault-tolerant multi-party computation by determining whether all the pending transactions, regardless of an order of the pending transactions, are settable maintaining positive liquidity for each party of the parties;

upon determining a failure in determining whether all the pending transactions are nettable, determining, by the at least one hardware processor of each node related to each party of the parties, an optimized subset of transactions that are nettable without violating liquidity requirements for each party of the parties via a Karmarkar algorithm; and determining, by the at least one hardware processor of each node related to each party of the parties, a secret share and a commitment of a new balance for each party of the parties.

2. The method according to claim 1, wherein the publishing, by each party of the parties, the determined liquidity status comprises determining, by the at least one hardware processor of each node related to each party of the parties, an own new liquidity amount using a current liquidity amount and verified party-dependent total amounts of the pending transactions via the bulletin board.

3. The method according to claim 2, further comprising publishing, by the at least one hardware processor of each node related to each party of the parties, a commitment of the own new liquidity amount.

4. The method according to claim 1, further comprising upon not settling all the pending transactions, in the multi-lateral netting, carrying over the not settled pending transactions for a next settlement cycle.

5. The method according to claim 1, wherein a transaction between the parties relates to one type fungible tokens or to more than one type of fungible tokens.

6. The method according to claim 1, wherein the secure fault-tolerant multi-party computation is performed by a sub-group of the parties.

7. The method according to claim 1, wherein the publishing, by the at least one hardware processor of each node related to each party of the parties, the determined liquidity status is based on a concept of a non-interactive zero-knowledge proof.

8. The method according to claim 1, wherein the determining, for each party of the parties, whether all the pending transactions are settable maintaining positive liquidity for each party of the parties comprises performing a netting among the parties.

9. A system for a multi-lateral netting between parties, the system comprising:

a plurality of nodes, wherein each node related to a party of the parties, comprises a memory for storing program instructions, and a processor which, when executing the program instruction, is configured to:

collect independently pending transactions between at least a part of the parties;

publish a commitment of a party-dependent total value of the pending transactions to a bulletin board, wherein the bulletin board is accessible by all the parties;

secretly share de-commitments among the parties, wherein each party-dependent de-commitment enables a verification to the party-dependent total value of the pending transactions as part of the commitment;

compute, using a multi-party computation protocol, a revised balance after the multi-lateral netting in a process configured to handle the pending transactions;

publish a determined liquidity status to the bulletin board;

upon a determination of a failure in the publishing of the determined liquidity status, perform, using a subset of the plurality of nodes, a secure fault-tolerant multi-party computation by a determination of whether all the pending transactions, regardless of an order of the pending transactions, are settable maintaining positive liquidity for each party of the parties;

upon a determination of a failure in the determination of whether all the pending transactions are nettable, determine an optimized subset of transactions that are nettable without violation of liquidity requirements for each party of the parties via a Karmarkar algorithm; and determine a secret share and a commitment of a new balance for each party of the parties.

10. The system according to claim 9, wherein the processor, when executing the program instruction, is further configured to:

during the publishing of the determined liquidity status, determine an own new liquidity amount using a current liquidity amount and verified party-dependent total amounts of the pending transactions via the bulletin board.

11. The system according to claim 10, wherein the processor, when executing the program instruction, is further configured to publish a commitment of the own new liquidity amount.

12. The system according to claim 9, wherein the processor, when executing the program instruction, is further configured to: upon not settling all the pending transactions, in the multi-lateral netting, carry over the not settled pending transactions for a next settlement cycle.

13. The system according to claim 9, wherein a transaction between the parties relates to one type fungible tokens or to more than one type of fungible tokens.

14. A computer program product for a multi-lateral netting between parties, said computer program product comprising a computer readable storage medium having program instructions embodied therewith, said program instructions being executable by one or more computing systems to cause said one or more computing systems to:

collect independently pending transactions between at least a part of the parties;

publish a commitment of a party-dependent total value of the pending transactions to a bulletin board, wherein the bulletin board is accessible by all the parties;

secretly share de-commitments among the parties, wherein each party-dependent de-commitment enables a verification to the party-dependent total value of the pending transactions as part of the commitment;

compute, using a multi-party computation protocol, a revised balance after the multi-lateral netting in a process configured to handle the pending transactions;

publish a determined liquidity status to the bulletin board;

upon a determination of a failure in the publishing of the determined liquidity status, perform a secure fault-tolerant multi-party computation by a determination of whether all the pending transactions, regardless of an order of the pending transactions, are settable maintaining positive liquidity for each party of the parties;

upon a determination of a failure in the determination of whether all the pending transactions are nettable, determine an optimized subset of transactions that are nettable without violation of liquidity requirements for each party of the parties via a Karmarkar algorithm; and determine a secret share and a commitment of a new balance for each party of the parties.

* * * * *